United States Patent [19]
Guedalia et al.

[11] Patent Number: 6,148,333
[45] Date of Patent: Nov. 14, 2000

[54] METHOD AND SYSTEM FOR SERVER ACCESS CONTROL AND TRACKING

[75] Inventors: Isaac David Guedalia, Bet Shemesh; Jonathan Hashkes, Jerusalem, both of Israel

[73] Assignee: MGI Software Corporation, Richmond Hill, Canada

[21] Appl. No.: 09/078,441

[22] Filed: May 13, 1998

[51] Int. Cl.[7] .................................................. G06F 13/00
[52] U.S. Cl. .............................................................. 709/219
[58] Field of Search .................................... 709/200, 202, 709/203, 216, 217, 218, 219, 224, 229

[56] References Cited

U.S. PATENT DOCUMENTS 5,935,207  8/1999  Logue et al. ............................ 709/219

OTHER PUBLICATIONS http://www.w3.org/Protocols, no date.
Hethmon, Paul S., "Illustrated Guide to HTTP", Manning Publications Co., Greenwich, CT, 1997.
http://204.57.196.12:80/reference/htmlspec2.0, no date.
http://www.pricecostco.com/exchange/irf/cgi-spec.html, no date.
Jeffry Dwight, Michael Erwin, and Robert Niles, "Using CGI", Second Edition, Que Corporation, Indianapolis, IN, 1997.
"Internet Imaging Protocol", 1997, Hewlett Packard Company, Live Picture, Inc., and Eastman Kodak Company.
"FlashPix Format Specification", 1996, 1997, Eastman Kodak Company.

*Primary Examiner*—Robert B. Harrell
*Attorney, Agent, or Firm*—Blakely, Sokoloff, Taylor & Zafman

[57] ABSTRACT

A method and system for monitoring activity of an image server which stores a multiplicity of images, at least some of which contain plural image portions, the method including the steps of monitoring which of the multiplicity of images stored on the image server are accessed, monitoring accessing of individual ones of the plural image portions of each of the multiplicity of images stored on the image server which are accessed, and providing an output indication of the number of times that each image portion of the multiplicity of images stored on the image server is accessed.

72 Claims, 9 Drawing Sheets

Privileged Policy:

Apply to the following:

| Groups: | Edit Group List |
| Internet Addresses: | Edit Internet Address List |

| Show all requested images through resolution: | None | 1 | 2 | 3 | 4 | 5 | 6 | 7 | 8 | 9 | All |

Otherwise:

| Watermark | Option 1 | Option 2 | Option 3 |
| Overlay | Option 1 | Option 2 | Option 3 |
| Display Error | | | |

FIGURE 5

METHOD AND SYSTEM FOR SERVER ACCESS CONTROL AND TRACKING

CROSS REFERENCES TO RELATED APPLICATIONS

The present application is related to (i) U.S. Pat. No. 5,968,120 filed on May 2, 1997 and entitled METHOD AND SYSTEM FOR PROVIDING ON-LINE INTERACTIVITY OVER A SERVER-CLIENT NETWORK; (ii) pending applications Ser. No. 08/979,220 filed on Nov. 26, 1997 and Ser. No. 09/095,459 filed on Jun. 10, 1998, both entitled A METHOD AND SYSTEM FOR HTML-DRIVEN INTERACTIVE IMAGE CLIENT, and (iii) pending application Ser. No. 09/045,068 filed on Mar. 19, 1998 and entitled A METHOD AND SYSTEM FOR PROVIDING ON-LINE INTERACTIVITY OVER A SERVER-CLIENT NETWORK.

FIELD OF THE INVENTION

The present invention relates to Internet image servers generally, and more particularly to access control and tracking functionality of such servers.

BACKGROUND OF THE INVENTION

Sharing of information has long been a goal of modern civilization. Information must be represented in some form in order that it be transferred between people. Visual stimulation is perhaps the most efficient means for people to acquire information. The cliche "a picture is worth a thousand words" is well-founded.

Recently information has taken on a digital form, which has enhanced the ease of electronic transmission of information. The most notable example is the dissemination of information through the World Wide Web (referred to simply as the "Web"), which is a collection of millions of computers interconnected by electronic communication devices.

A server is used for placing information where it is available for access by multiple users. The Web has enabled convenient publishing of information from a server, or host computer (referred to simply as a "server"), to user computers (referred to simply as "clients") that are controlled by users requesting information.

Accessing information over the Web is typically done using Web browsers. A Web browser is software that resides on a user computer and communicates with servers via established Internet protocols. Information transmitted by servers is converted to visual displays on the user computer by means of a Web browser.

Internet protocols enable client-server communication over the Web. These protocols include low level protocols, such as Transaction Control Protocol/Internet Protocol (TCP/IP), and higher level protocols such as Hypertext Transfer Protocol (HTTP) A general reference on Internet protocols may be accessed on:

http:/www.w3.org/Protocols, or on http:/www.cis.ohio-state.edu/tbin/rfc/arpa-internet-protocols.html. Another useful reference is: Hethmon, Paul S., *Illustrated Guide to HTTP*, Manning Publications Co., Greenwich, Conn., 1997.

HTTP servers provide a way for remote clients to access data on servers. The HTTP protocol provides a method for making simple requests from a user to a server. User requests can take the form of GET requests or POST requests in HTTP. Typically, in a GET or POST request the user specifies a file to be delivered, and through HTTP headers the server can specify what is being delivered. The most pervasive file format used on the Web is HyperText Markup Language (HTML). A reference on HTML may be accessed at:

http:/204.57.196.12/reference/htmlspec2.0.

HTML files are typically relatively small, i.e. less than 100 Kbytes.

HTTP Ver. 1.0 specifies that a communication between a server and user proceeds as follows: A user's request is initiated with a header which is terminated by a double carriage return linefeed. This is followed by the body of the request which is similarly terminated by a double carriage return linefeed. The server responds with an HTTP header terminated with a carriage return linefeed and then sends the body of the response. The response is terminated when a connection is closed. This normally occurs when the server has finished sending data to the user, and the server closes the connection.

Server performance is generally inversely proportional to the quantity of data being served per unit time. The task of delivering a file from a server to a user is typically not computationally expensive. This task includes reading the file from the server's peripherals, e.g. a disk drive, and transmitting the data from the file in the specified protocol, e.g. TCP/IP. TCP/IP transmits data in units of "packets." The time it takes for a user to retrieve a file depends upon the number of packets transmitted by the server.

Added functionality for server-side applications may be provided via a secondary protocol, such as Common Gateway Interface (CGI). A reference on CGI may be accessed at:

http:/www.pricecostco.com/exchange/irf/cgi-spec.html.

Reference is also made to Dwight, J., Erwin, Michael and Niles, Robert, *Using CGI, Second Edition*, Que Corporation, Indianapolis, Ind., 1997.

Communication of digital signals between computers is plagued by a bandwidth problem, where a limited bandwidth creates bottlenecks in the transmission of electronic signals. Fortunately, textual information is largely immune to the bandwidth problem, since it can be compactly represented electronically, and this has enabled the Web publishing industry to flourish. Unfortunately, however, image information is difficult to represent compactly in electronic form. Whereas even complex text information, such as multiple fonts and scales, can be represented with a few dozen bytes of HTML, images are usually orders of magnitude larger.

Images are typically represented in one of two standard formats, JPEG or GIF. Currently, to transmit a small photograph over the Web, such as a 2"×3" photograph scanned in at 300 dots per inch (dpi) and compressed using JPEG, takes more than two minutes over a typical 1 KByte per second connection. This makes the viewing of quality images, such as a small museum painting of size 10"×10" scanned in at resolution 300 dpi, very very slow.

A recently developed protocol, the Internet Imaging Protocol (IIP), was designed specifically for mitigating the bandwidth problem. It exploits the fact that the user cannot view more than a computer screen of image data at any one time. Even if the full image is enormous, such as 15,000× 15,000 pixels, the user never views more than the screen resolution, usually less than 1,024×1,024 pixels, at any given time. Thus it is unnecessary to transmit more than a screen-size amount of data, for any specific view of the image. IIP specifies a method for a user to request portions of an image at a specific resolution. A reference for IIP is the document "Internet Imaging Protocol," ©1997 Hewlett Packard Company, Live Picture, Inc., and Eastman Kodak Company, the contents of which are hereby incorporated by reference.

A server with server-side software that supports IIP is referred to as an "image server." Currently there are two popularly accepted ways to request image data from an image server using IIP; namely, primarily using server-side processing of the request, or primarily using client-side processing.

To illustrate server-side processing, suppose a user with a viewing window of 640×480 pixels desires to view an image whose full resolution is 15,000×15,000 pixels. The user is unable to view the full image at its original resolution, and can either view the complete image at a low resolution, or view only a portion of the image at a high resolution. Usually the user prefers to begin with an initial view showing the full image at a low resolution, and then to interactively navigate by zooming, i.e., increasing the resolution while decreasing the "field of view," or the portion of the image being viewed, and panning, i.e. translating the current view.

In accordance with the IIP, the full image at a 640×480 pixel resolution for an initial view can be requested using the following set of IIP commands:

fif=<image name>&wid=640&hei=480&cvt=jpeg

This request specifies the desired image by means of the f i f command, and specifies the width and height of the user viewing window by means of the wid and hei commands, respectively. The last command, cvt, specifies the format of the image to be sent. As mentioned hereinabove, JPEG is supported by most browsers.

For the image server to process the above IIP request, the server must analyze the original image and generate an image matching the requested specifications, specifically the desired portion and dimensions. The analysis and generation are usually computationally expensive. In the example under discussion, a 15,000×15,000 pixel image would have to be re-sized, requiring approximately 675 MBytes to process.

To facilitate this processing, images can be stored in a pre-computed multi-resolution tiled format. Multi-resolution tiled images are constructed by first creating multiple copies of the image at different resolutions. Moreover, at each resolution the image is partitioned into a collection of disjoint tiles.

FLASHPIX®, a registered trademark of the Digital Imaging Group (DIG), is an example of a multi-resolution tiled image format A FlashPix image is constructed by starting with an original image and recursively sub-sampling it at half the resolution. The recursion continues until the final sub-sampled image is reduced to 64 pixels or less in each dimension. Each resolution level is partitioned into tiles that are 64×64 pixels in size. A reference for FLASHPIX® is a document "FlashPix Format Specification," ©1996, 1997, Eastman Kodak Company, the contents of which are hereby incorporated by reference.

Referring to the abovementioned example, for a FlashPix image server to respond with an image at 640×480 pixel resolution that contains the full original image which is sub-sampled, is simply a matter of selecting an appropriate close pre-computed resolution. Using the numbers in the example, the successive resolutions are 15,000×15,000 pixels, then 7,500×7,500 pixels, then 3,750×3,750 pixels, then 1,875×1,875 pixels, then 937×937 pixels, etc. For example, the image server can choose resolution level 937×937 pixels and re-sample to 640×480 pixels. This is far better than working with a 15,000×15,000 pixel image.

FlashPix images are more complicated than simple raster images. The individual 64×64 tiles into which each resolution is partitioned are usually JPEG compressed for Internet applications. Furthermore, the FlashPix format specification requires that the tiles be stored in a storage within a Microsoft OLE structured storage file. Structured storage files are compound files composed of multiple storages and streams, where storages are analogous to folders/directories and streams are analogous to files. Although there is overhead in accessing information inside a structured storage file, such files provide a clean interface for a complicated file structure. Structured storage is discussed in Appendix A of the above-referenced FlashPix Format Specification.

Assignee's co-pending U.S. patent application Ser. No. 08/979,220 filed Nov. 26, 1997 and entitled A METHOD AND SYSTEM FOR HTML-DRIVEN INTERACTIVE IMAGE CLIENT, the disclosure of which is hereby incorporated by reference, describes a way to view FlashPix images using the IIP cvt command, without the need for a plug-in or a Java applet. Each interactive user navigation command is implemented through a dynamic HTML page containing a cvt command with appropriate parameters. This puts a maximum strain on the server, as nearly all processing is done on the server side.

The invention described in the aforesaid U.S. patent application Ser. No. 08/979,220 filed Nov. 26, 1997 and entitled A METHOD AND SYSTEM FOR HTML-DRIVEN INTERACTIVE IMAGE CLIENT utilizes caching to alleviate the computing burden, so that processed data is immediately available for repeated requests from one or many clients for the same image portion.

SUMMARY OF THE INVENTION

The present invention provides a method and system for an imaging server to control access to selected image data and to track user requests and usage.

There is thus provided in accordance with a preferred embodiment of the present invention a method for monitoring activity of an image server which stores a multiplicity of images, at least some of which contain plural image portions, the method including the steps of monitoring which of the multiplicity of images stored on the image server are accessed, monitoring accessing of the plural image portions of each of the multiplicity of images stored on the image server which are accessed, and providing an output indication of the number of times that each image portion of the multiplicity of images stored on the image server is accessed.

There is also provided in accordance with a preferred embodiment of the present invention a method for monitoring activity of an image server which stores a multiplicity of images, the method including the steps of monitoring which of the multiplicity of images stored on the image server are accessed, monitoring the time duration during which each of the multiplicity of images stored on the image server is accessed, and providing an output indication of the time duration that each of the multiplicity of images stored on the image server is accessed.

Moreover in accordance with a preferred embodiment of the present invention the method also includes the steps of monitoring the time duration during which each of the multiplicity of images stored on the image server is accessed, and providing an output indication of the time duration that each of the multiplicity of images stored on the image server is accessed.

There is also provided in accordance with a preferred embodiment of the present invention a method for monitoring activity of an image server which stores a multiplicity of images, at least some of which contain plural image portions, the method including the steps of monitoring which of the multiplicity of images stored on the image server are accessed, monitoring the time duration during which each of the image portions of the multiplicity of images stored on the image server is accessed, and providing an output indication of the time duration that each of the image portions of the multiplicity of images stored on the image server is accessed.

Moreover in accordance with a preferred embodiment of the present invention the method also includes the steps of monitoring the amount of information content downloaded from the image server while each of the multiplicity of images stored on the image server is accessed, and providing an output indication of the amount of information content downloaded while each of the multiplicity of images stored on the image server is accessed.

Additionally in accordance with a preferred embodiment of the present invention the method also includes the steps of monitoring the amount of information content downloaded from the image server while individual ones of the plural image portions of each of the multiplicity of images stored on the image server are accessed, and providing an output indication of the amount of information content downloaded while individual ones of the plural image portions of each of the multiplicity of images stored on the image server are accessed.

Further in accordance with a preferred embodiment of the present invention the method also includes the steps of monitoring the number of users accessing at least one of the multiplicity of images within a given time parameters, and providing an output indication of whether and to what extent the number of users exceeds a predetermined threshold.

There is also provided in accordance with a preferred embodiment of the present invention a method for controlling activity of an image server which stores a multiplicity of images, at least some of which are at various levels of resolutions, the method including the steps of monitoring the authorization status of a user seeking to access one of the multiplicity of images stored on an image server, and controlling access to the multiplicity of images stored on the image server based on the level of resolution of the image to which the user seeks access and the authorization status of the user.

Moreover in accordance with a preferred embodiment of the present invention at least some of the multiplicity of images are stored on the image server at plural levels of resolution, and the step of controlling access determines whether access is provided to an image at a given one of the plural levels of resolution.

Additionally in accordance with a preferred embodiment of the present invention the step of controlling access includes controlling viewing.

Further in accordance with a preferred embodiment of the present invention the step of controlling access includes controlling downloading.

Still further in accordance with a preferred embodiment of the present invention the step of controlling access includes controlling printing.

Moreover in accordance with a preferred embodiment of the present invention the step of controlling access includes determining whether an image is provided to a user with markings.

Additionally in accordance with a preferred embodiment of the present invention the step of controlling access includes determining whether an image is provided to a user.

Further in accordance with a preferred embodiment of the present invention the multiplicity of images include images for which access is provided to a user irrespective of the authorization status of a user.

Still further in accordance with a preferred embodiment of the present invention the at least some of the multiplicity of images stored on the image server at plural levels of resolution include images for which access is provided to a user at all of the plural levels of resolution irrespective of the authorization statue of the user.

Moreover in accordance with a preferred embodiment of the present invention the step of monitoring the authorization status of a user includes the step of determining which of a plurality of authorization levels is associated with a given user.

There is also provided in accordance with a preferred embodiment of the present invention a method for controlling and monitoring activity of an image server which stores a multiplicity of images, at least some of which contain plural image portions and are at various levels of resolutions, the method including the steps of monitoring which of the multiplicity of images stored on the image server are accessed, monitoring accessing of the plural image portions of each of the multiplicity of images stored on the image server which are accessed, providing an output indication of the number of times that each image portion of the multiplicity of images stored on the image server is accessed, monitoring the authorization status of a user seeking to access one of the multiplicity of images stored on an image server, and controlling access to the multiplicity of images stored on the image server based on the level of resolution of the images to which the user seeks access and the authorization status of the user.

There is also provided in accordance with a preferred embodiment of the present invention a system for monitoring activity of an image server which stores a multiplicity of images, at least some of which contain plural image portions, the system including an image monitor, monitoring which of the multiplicity of images stored on the image server are accessed, an image portion monitor, monitoring accessing of the plural image portions of each of the multiplicity of images stored on the image server which are accessed, and an output device, providing an output indication of the number of times that each image portion of the multiplicity of images stored on the image server is accessed.

There is also provided in accordance with a preferred embodiment of the present invention a system for monitoring activity of an image server which stores a multiplicity of images, the system including an image monitor, monitoring which of the multiplicity of images stored on the image server are accessed, a time monitor, monitoring the time duration during which each of the multiplicity of images stored on the image server is accessed, and an output device, providing an output indication of the time duration that each of the multiplicity of images stored on the image server is accessed.

Moreover in accordance with a preferred embodiment of the present invention the system also includes a time monitor, monitoring the time duration during which each of the multiplicity of images stored on the image server is accessed, and an output device, providing an output indication of the time duration that each of the multiplicity of images stored on the image server is accessed.

There is also provided in accordance with a preferred embodiment of the present invention a system for monitoring activity of an image server which stores a multiplicity of images, at least some of which contain plural image portions, the system including an image monitor, monitoring which of the multiplicity of images stored on the image server are accessed, a time monitor, monitoring the time duration during which each of the image portions of the multiplicity of images stored on the image server is accessed, and an output device, providing an output indication of the time duration that each of the image portions of the multiplicity of images stored on the image server is accessed.

Moreover in accordance with a preferred embodiment of the present invention the system also comprises a data monitor, monitoring the amount of information content downloaded from the image server while each of the multiplicity of images stored on the image server is accessed, and an output device, providing an output indication of the amount of information content downloaded while each of the multiplicity of images stored on the image server is accessed.

Additionally in accordance with a preferred embodiment of the present invention the system also includes a data monitor, monitoring the amount of information content downloaded from the image server while individual ones of the plural image portions of each of the multiplicity of images stored on the image server are accessed, and an output device, providing an output indication of the amount of information content downloaded while individual ones of the plural image portions of each of the multiplicity of images stored on the image server are accessed.

Further in accordance with a preferred embodiment of the present invention the system also includes a usage monitor, monitoring the number of users accessing at least one of the multiplicity of images within a given time parameters, and an output device, providing an output indication of whether and to what extent the number of users exceeds a predetermined threshold.

There is also provided in accordance with a preferred embodiment of the present invention a system for controlling activity of an image server which stores a multiplicity of images, at least some of which are at various levels of resolutions, the system including a status monitor, monitoring the authorization status of a user seeking to access one of the multiplicity of images stored on an image server, and an access controller, controlling access to the multiplicity of images stored on the image server based on the level of resolution of the image to which the user seeks access and the authorization status of the user.

Moreover in accordance with a preferred embodiment of the present invention at least some of the multiplicity of images are stored on the image server at plural levels of resolution, and the access controller determines whether access is provided to an image at a given one of the plural levels of resolution.

Additionally in accordance with a preferred embodiment of the present invention the access controller controls viewing.

Further in accordance with a preferred embodiment of the present invention the access controller controls downloading.

Still further in accordance with a preferred embodiment of the present invention the access controller controls printing.

Moreover in accordance with a preferred embodiment of the present invention the access controller determines whether an image is provided to a user with markings.

Additionally in accordance with a preferred embodiment of the present invention the access controller determines whether an image is provided to a user.

Further in accordance with a preferred embodiment of the present invention the multiplicity of images include images for which access is provided to a user irrespective of the authorization status of a user.

Still further in accordance with a preferred embodiment of the present invention the at least some of the multiplicity of images stored on the image server at plural levels of resolution include images for which access is provided to a user at all of the plural levels of resolution irrespective of the authorization statue of the user.

Moreover in accordance with a preferred embodiment of the present invention the status monitor includes an authorization verifier, determining which of a plurality of authorization levels is associated with a given user.

There is also provided in accordance with a preferred embodiment of the present invention a system for controlling and monitoring activity of an image server which stores a multiplicity of images, at least some of which contain plural image portions and are at various levels of resolutions, the system including an image monitor, monitoring which of the multiplicity of images stored on the image server are accessed, an image portion monitor, monitoring accessing of the plural image portions of each of the multiplicity of images stored on said image server which are accessed, an output device, providing an output indication of the number of times that each image portion of the multiplicity of images stored on the image server is accessed, a status monitor, monitoring the authorization status of a user seeking to access one of the multiplicity of images stored on the image server, and an access controller, controlling access to the multiplicity of images stored on the image server based on the level of resolution of the images to which the user seeks access and the authorization status of the user.

BRIEF DESCRIPTION OF THE DRAWINGS

The present invention will be more fully understood and appreciated from the following detailed description, taken in conjunction with the drawings in which:

FIG. 5 is an illustration of part of a user interface from an image server, for specifying a privileged display mode;

DETAILED DESCRIPTION OF A PREFERRED EMBODIMENT

The present invention concerns a method and system in which an image server controls access to selected image data and tracks user requests and usage.

Access Control

Image servers are typically used to manage large image collections. Often, control over usage of these images is a central concern of the operator of an image server. Businesses with large image banks loaded onto image servers are concerned with who can view, print or save images locally, and at what quality and resolution. Usually these businesses have large databases of user information, product information and transaction- processing software which are operative with image servers. Information can be transferred to and from an image server, connecting it to databases and other information systems.

Access control is typically administered by a person designated as a server administrator. Access control can be implemented based on one or more parameters, such as characteristics of users and images and combinations thereof. Access control enables a server administrator to provide different degrees of access to images stored within different image directories.

Typically access control determines under what conditions an image is made available to a user and the mode in which an image is displayed, based on parameters related to the user, the image and the user's request. Examples of modes for displaying an image are (i) rendering the image intact in an unmodified form, (ii) rendering the image with one or more watermarks embedded therein and (iii) rendering the image with solid single-color overlays. When an image is not immediately made available to a user requesting it, the server may (i) prompt the user for a username and password or (ii) issue a message.

The mode in which an image is displayed can vary depending on the user, depending on the image being requested, or even depending on the resolution level being requested from an image. It will be apparent to one skilled in the art that other functional relationships between image requests and image displays are also possible.

Figure 1:
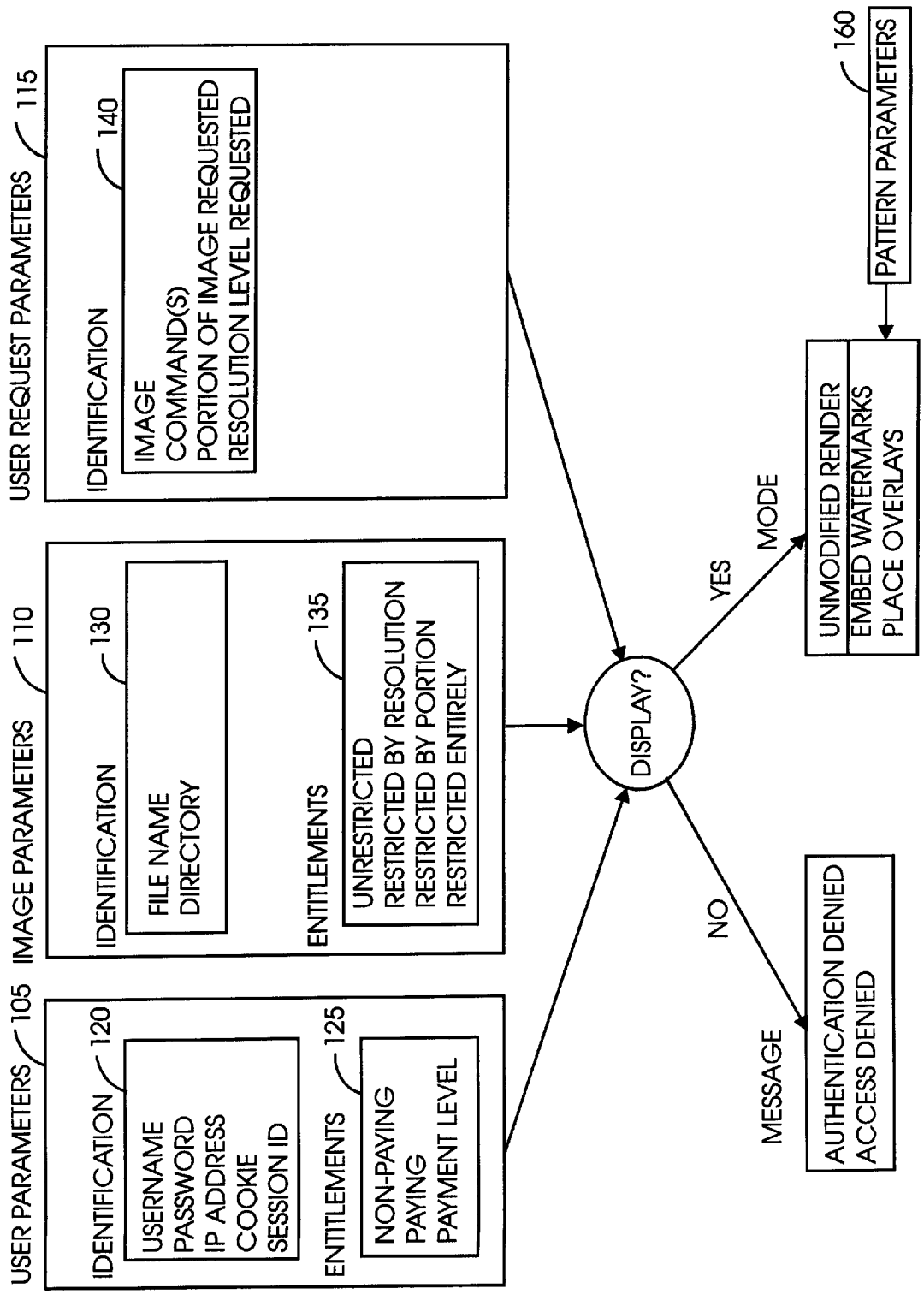
FIG. 1 is an illustration of an example of implementation of access control.

Reference is now made to FIG. 1 which illustrates an example of implementation of access control. A database 105 stores a list of user parameters and a database 110 stores a list of image parameters. User request parameters, by means of which a user requests a portion of data from an image, are indicated by reference numeral 115. User parameters preferably include user identification information 120 and user entitlement information 125.

User identification information 120 can include a username, a password and an IP address. It can also include a "cookie" from the user computer, and a session ID for the current server-client session. A cookie is a file resident on a user computer that is transferred from the user to a server by being embedded within an HTTP request, and is sent from the server to the user within an HTTP response. The server may write information, such as a session ID, in the cookie, thereby maintaining a record on the user computer.

Image database 110 stores images and portions thereof. Each image has identification information 130, such as its file name and its resident directory indicator. In addition, each image has entitlement information 135 regarding possible entitlements and possible display restrictions appertaining thereto. Examples of possible entitlements and possible display restrictions include unrestricted display in the image's unmodified form, restriction on the basis of resolution level requested, restriction on the basis of the portion of the image requested and total restriction. Restriction on the basis of resolution level typically allows users to view low resolution levels of an image, but restricts viewing of high resolution levels to users having appropriate entitlements.

A user request, whose parameters are indicated in block 115, preferably originates from an IIP request that was parsed, and typically includes the name of an image, one or more commands, and information as to the resolution level of the image and the portion of the image required to fulfill the user request.

Using information contained in the user database 105, the image database 110 and the user request parameters 115, an image server, implementing a predetermined access control policy, decides whether or not to provide image data for display. If the server decides not to display image data, a message is sent to the user indicating, for example, that authentication has been denied to a user or that access has been denied to the specifically requested image data.

If the server decides to provide image data, then the mode of display is determined. Display modes can be, for example, to render the portion of the image requested in its unmodified form, to watermark the portion of the image requested by embedding one or more watermarks in the image data, or to overlay one or more single colors on the portion of the image requested.

Watermarks and overlays typically cover only small rectangular regions of image data and, as such, a display mode preferably repeats the watermark or overlay in a regular repetitive pattern. For example, a 64×64 pixel watermark can be embedded into a large image repetitively, according to a checkerboard pattern, whereby every alternate 64×64 pixel block of the large image is overlaid with the watermark. Geometric parameters 160 for describing the desired repetitive watermark or overlay pattern are provided to specify the display mode.

Watermarking enables companies to put their company logo on each image they serve, so that if the image is re-distributed it will contain the company's logo. Watermarking or overlaying an image serves to render the image in a way that discourages or precludes unauthorized or commercial use. This also helps to protect copyrighted images.

In a preferred embodiment of the present invention, each directory containing image files may have two policies associated therewith: a default policy and a privilege policy. The default policy is preferably used in all cases where user authentication criteria for the privilege policy are not met. For example, a directory might have a privilege policy indicating that for user group A, which includes IP addresses, such as IP=123.45.56.* and users X, Y and Z, the policy is to watermark the image with certain pattern parameters. The default policy might be that a user receives a message stating, for example, that "the image you have requested is not available to you." As requests arrive at the server, they are evaluated to determine if a user meets the authentication criteria. Responses to a user who does not meet the authentication criteria are governed by the default policy.

Alternative embodiments are also possible. For example, the default policy might be that a user receives watermarked images. As another example, the default policy might be that a user receives unmodified image data whenever the user's request involves low resolution image data, and that a user receives watermarked image data otherwise. As yet another example, the default policy might be that a user receives unmodified image data whenever the user's request involves only specific portions of image data, and that a user receives overlaid image data otherwise.

Similarly, the privilege policy might be, for example, that a user whose request is within the scope of the user's entitlements receives unmodified image data, whereas a user whose request is outside the scope of his entitlements receives only a watermarked image.

In addition, access control can be selectively effected or disabled within any given directory containing image files.

Figure 2:
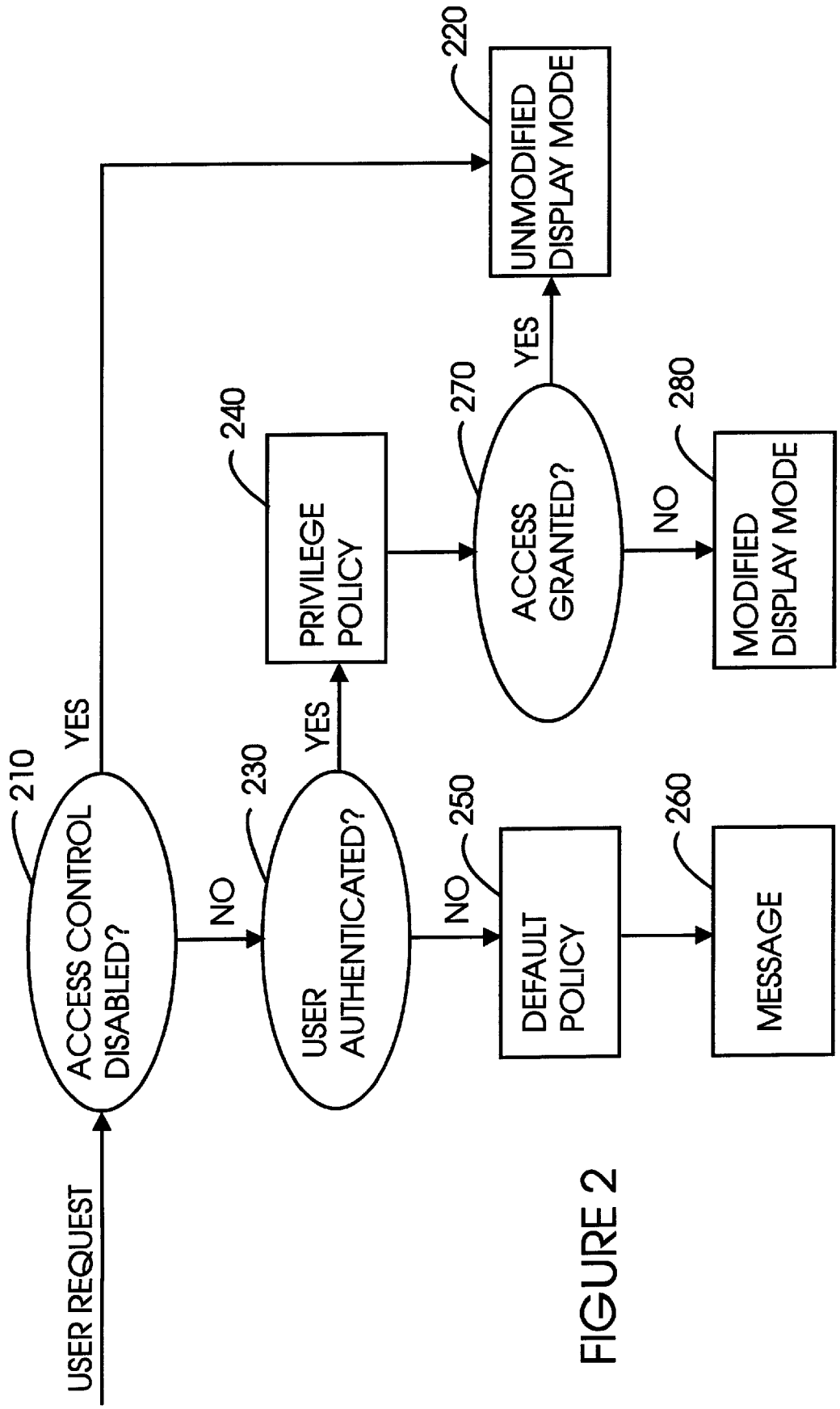
FIG. 2 is an illustration of the application of default and privilege policies in a preferred embodiment of the present invention.

Reference is now made to FIG. 2 which illustrates the application of default and privilege policies in a preferred embodiment of the present invention. A user request arrives at an image server. At unit 210 the server checks whether access control is currently effected or disabled. If access control is disabled, then unmodified image data is sent for display at unit 220. Otherwise, if access control is in effect, then unit 230 checks for user authentication.

If a user is authenticated, unit 240 applies the privilege policy. Otherwise, if a user is not authenticated, then unit 250 applies the default policy. Illustrated in FIG. 2 is a default policy that sends a message to the user at unit 260. Examples of possible default policies are:
issue message;
display low resolution image;
display partial image;
display marked image.

Privilege policy unit 240 verifies the entitlement of the user within a user database. Unit 270 determines whether or not the user is granted access to the requested image data, pursuant to a given image request. The determination of whether or not access is granted preferably depends on the user group and on the image group. Examples of possible privilege policies are:
display all images in all resolutions;
display all images at various resolutions for various entitlements;
display certain images at various resolutions for various entitlements;
display all images with various markings for various entitlements;
display certain images with various markings for various entitlements;
display various portions of images for various entitlements.

Various combinations of the foregoing may also be employed.

If access is granted at unit 270, then unmodified image data is sent for display at unit 220. Otherwise, if access is denied, then modified image data is sent for display at unit 280. The modified image data can be watermarked image data or overlaid image data. Alternatively, if access is denied to an authenticated user, image data to which the user is entitled and which is closest to the image data requested by the user is sent for display, together with an explanatory message.

It is apparent to one skilled in the art that a wide variety of possibilities of default and privilege policies are possible and within the scope of the present invention. Similarly, it is possible to by-pass user authentication while user requests are confined to data within image directories that have unrestricted access. Such access control logic, with user authentication by-passed until required, is described with reference to FIG. 3A hereinbelow.

The primary function of access control in the present invention is to decide, based upon user information, image information and user request information, which display mode is applicable or which non-display message to send. Access control provides server administrators with flexibility in controlling access to image directories on the server. To specify access control the following minimal set of parameters should preferably be determined for each directory containing image files:

1) Whether access control is effected or disabled for the directory.
2) The various user groups entitled to the privilege policy, each user group including a list of users and IP addresses, and the corresponding user group entitlement, the user group entitlement including (a) the entitled image resolution up to which and the entitled image portions for which each user in the group is entitled to receive unmodified image data, and, in case a user requests data beyond the entitled resolution or outside of the entitled portions, (b) the type of modified image data to be sent (watermarked or overlaid) and (c) the type of watermark or overlay repetitive pattern geometric parameters, as applicable.
3) The default policy that applies to all users allowed into the site but not entitled to enjoy the privilege policy. This includes (a) the type of display (full, watermarked, overlaid) and (b) the type of watermark or overlay repetitive pattern geometric parameters, as applicable.

In a preferred embodiment of the present invention default and privilege policies may be set for one or more directories. Policies for sub-directories are inherited from their parent directory, unless policies for the sub-directories are explicitly set.

For example, a company may have a large database of images and a large database of users, each with corresponding access privileges. The company may have three groups of images: A, B and C. To implement separate access policies for each group of images, the image files can be organized into three corresponding directories on the server. For example, the policies may be that anyone can view group A images, but only paying users can view group B and C images. Moreover, group C images may be only shown to premium users, and not to standard users. The company's image server is preferably connected to its user and image databases, and it will regulate access to these images accordingly.

The operation of the image server of the present invention may be understood more clearly from a consideration of the following example which illustrates how paying users and non-paying users interface with the server.

Figure 3A:
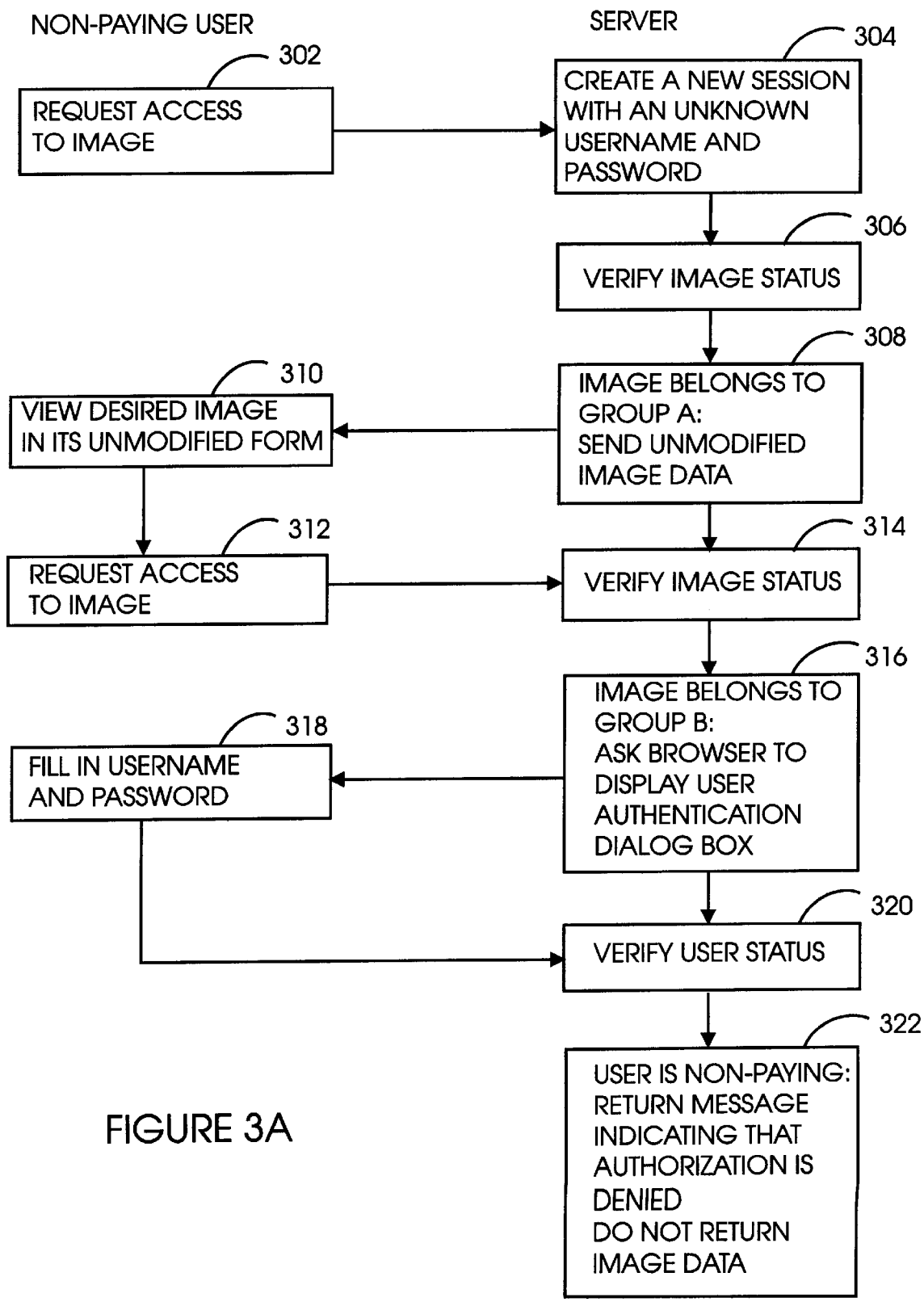
FIG. 3A is an illustration of a typical example of operation of a preferred embodiment of the present invention during a session between a non-paying user and a server.

Reference is now made to FIG. 3A which illustrates a typical example of operation of a preferred embodiment of the present invention during a session between a non-paying user and a server, using the three groups of images A, B and C described in the above example. When the non-paying user tries to access an image for the first time at step 302, the image server recognizes that a new session has started, and creates a new session with an unknown username and password at step 304. Since a new image within this session is being requested, the server checks the directory in which the new image is located and its status at step 306, in order to apply the correct display mode or non-display message. The server confirms that the new image is a group A image, and it preferably sends unmodified image data at step 308. The image is then displayed by the client at step 310 in its unmodified form, as the non-paying user requested.

If, on the other hand, a non-paying user tries to access an image as in step 312, which the server ascertains to belong to group B at step 314, then in order to determine whether or not the user is entitled to view group B images, the server checks the session information. It discovers that no username and password was collected for the session, and decides to prompt the user for this information. The image server notifies the Internet browser to display an authentication dialog box on the user's computer at step 316.

The user fills in a username and password at step 318. When the image server receives the username and password that the non- paying user supplies, it verifies it with the user database at step 320, and determines that it does not exist within the user database. Realizing that the user is a non-paying user, and, as such, is not entitled to view group B images, the server indicates at step 322 that authentication is denied. The non-paying user receives no image information, only a message stating that authentication has been denied.

Figure 3B:
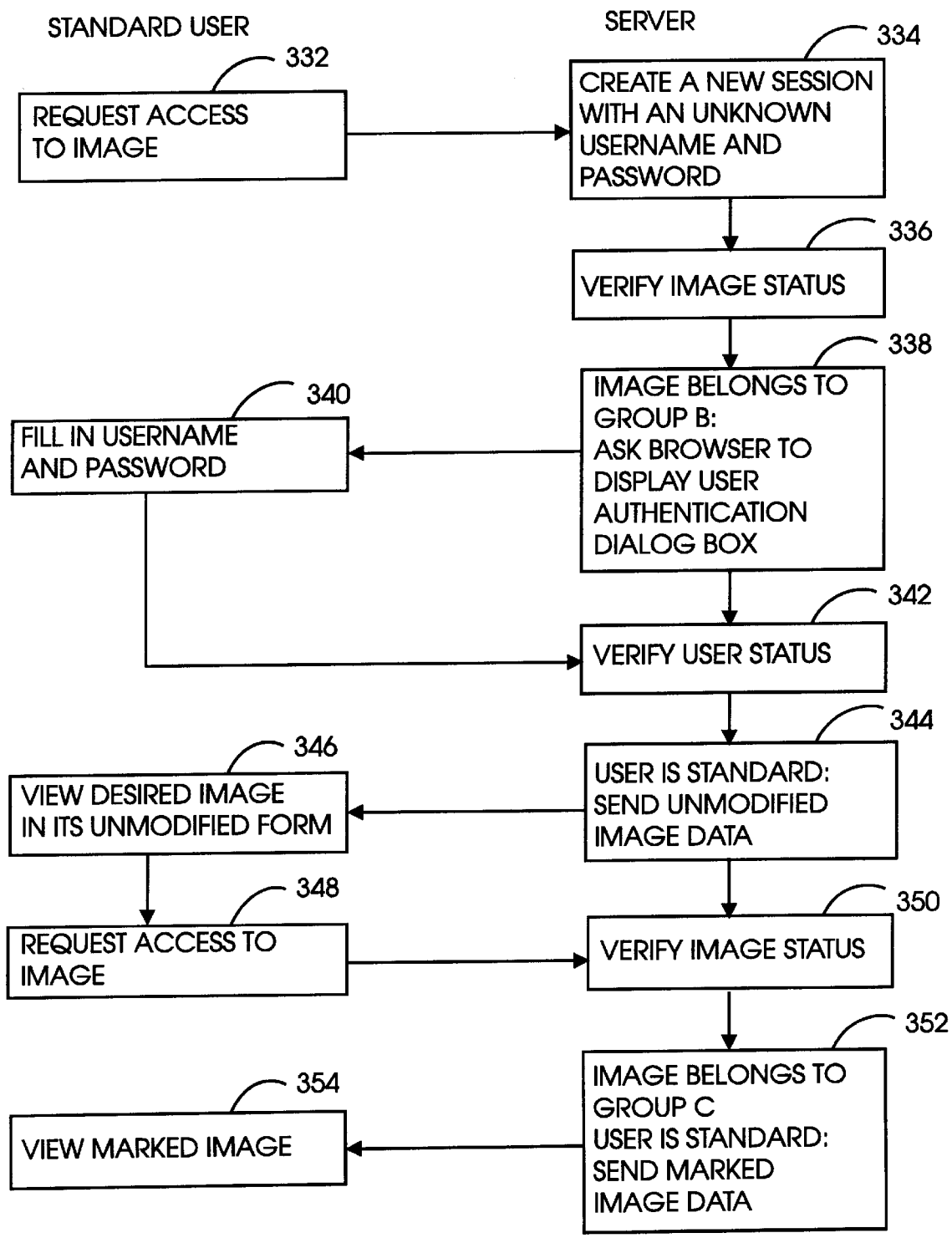
FIG. 3B is an illustration of a typical example of operation of a preferred embodiment of the present invention during a session between a standard user and a server.

Reference is now made to FIG. 3B which illustrates a typical example of operation of a preferred embodiment of the present invention during a session between a standard user and a server, using the three groups of images A, B and C described in the above example. When the standard user tries to access an image for the first time at step 332, the image server recognizes that a new session has started, and creates a new session with an unknown username and password at step 334. Since a new image within this session is being requested, the server checks the directory in which the new image is located and its status at step 336, in order to apply the correct display mode or non-display message. The server confirms that the new image is a group B image. In order to determine whether or not the user is entitled to view group B images, the server checks the session information. It discovers that no username and password was collected for the session, and decides to prompt the user for this information. The image server notifies the Internet browser to display an authentication dialog box on the user's computer at step 338.

The user fills in a username and password at step 340. When the image server receives the username and password that the user supplies, it verifies the username and password with the user database at step 342, and confirms that the user's username and password does match an existing entry from the user database, and preferably the server retrieves the corresponding entitlement information, such as how much the user paid or what the user is permitted to view. The server ascertains that the user is in fact a standard user, and at step 344 the server applies the privilege policy in accordance with the standard user's entitlements, and sends unmodified image data. The image is then displayed by the client at step 346 in its unmodified form, as the standard user requested.

If, on the other hand, a standard user tries to access an image as in step 348, which the server ascertains to belong to group C at step 350, then the server realizes that the user is a standard user, and, as such, is not entitled to view group C images. At step 352 the server denies access to the unmodified image data, and sends only watermarked or overlaid image data, which the standard user views at step 354.

Figure 3C:
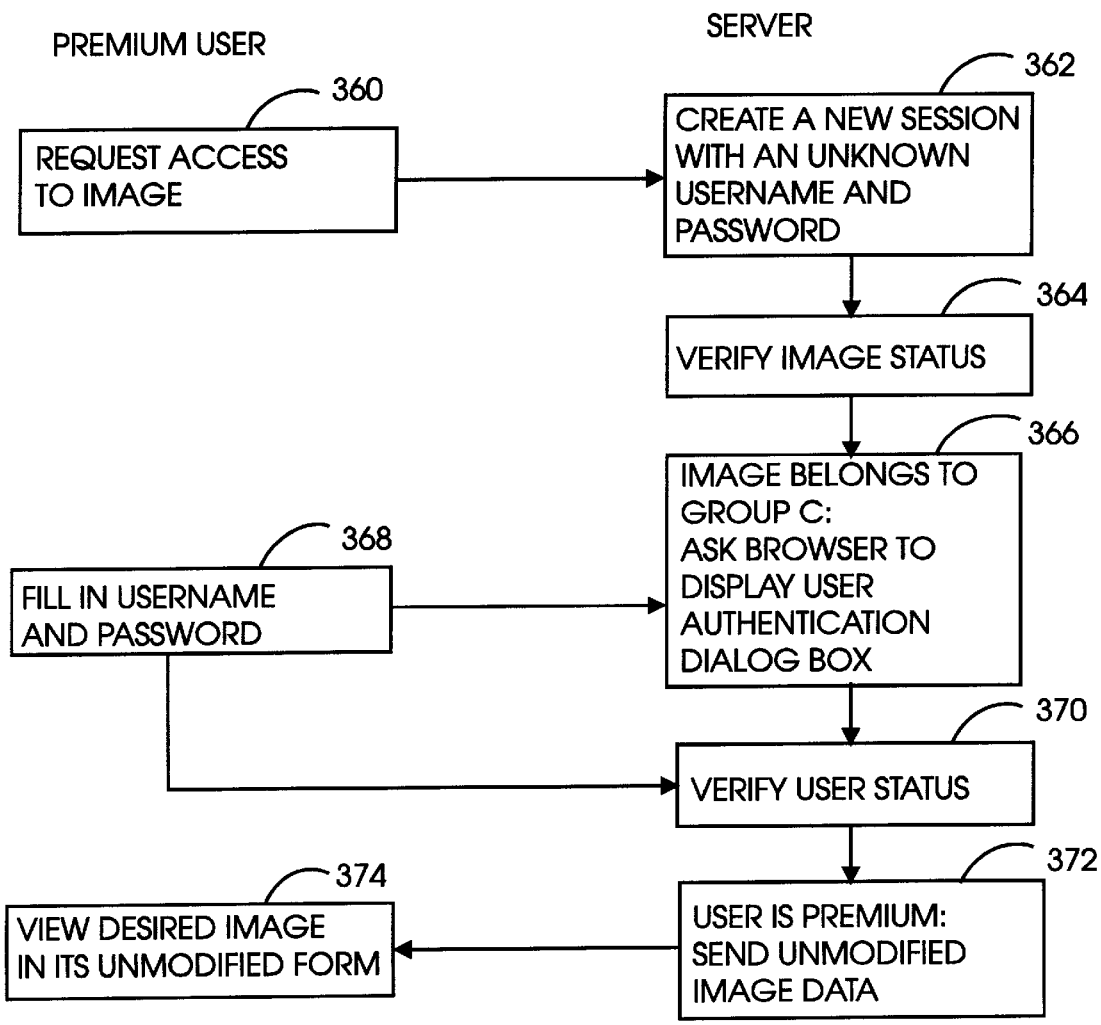
FIG. 3C is an illustration of a typical example of operation of a preferred embodiment of the present invention during a session between a premium user and a server.

Reference is now made to FIG. 3C which illustrates a preferred embodiment of the present invention during a session between a premium user and a server, using the three groups of images A, B and C described in the above example. When the premium user tries to access an image at step 360, the server recognizes that a new session has started, and creates a new session with an unknown username and password at step 362. Since a new image within this session is being requested, the server checks the directory in which the new image is located and its status at step 364, in order to apply the correct policy. The server ascertains that the new image is a group C image. To determine whether or not the user is authorized to view group C images, the server checks the session information. It discovers that no username and password was collected for the session, and decides to prompt the user for this information. The image server notifies the Internet browser to display an authentication dialog box on the user's computer at step 366.

The user fills in a username and password at step 368. When the image server receives the username and password that the user supplies, it verifies the username and password with the user database at step 370, and confirms that the user's username and password does match an existing entry from the user database, and preferably the server retrieves the corresponding entitlement information, such as how much the user paid or what the user is permitted to view. The server ascertains that the user is in fact a premium user, and at step 372 the server applies the privilege policy in accordance with the premium user's entitlements, and sends unmodified image data. The image is then displayed by the client at step 374 in its unmodified form, as the premium user requested. More generally, the server may check for detailed information about a paying user's request for image data, such as the resolution requested, and, based on the paying user's entitlement, the server sends unmodified or watermarked or overlaid image data in response to the request.

Figure 4:
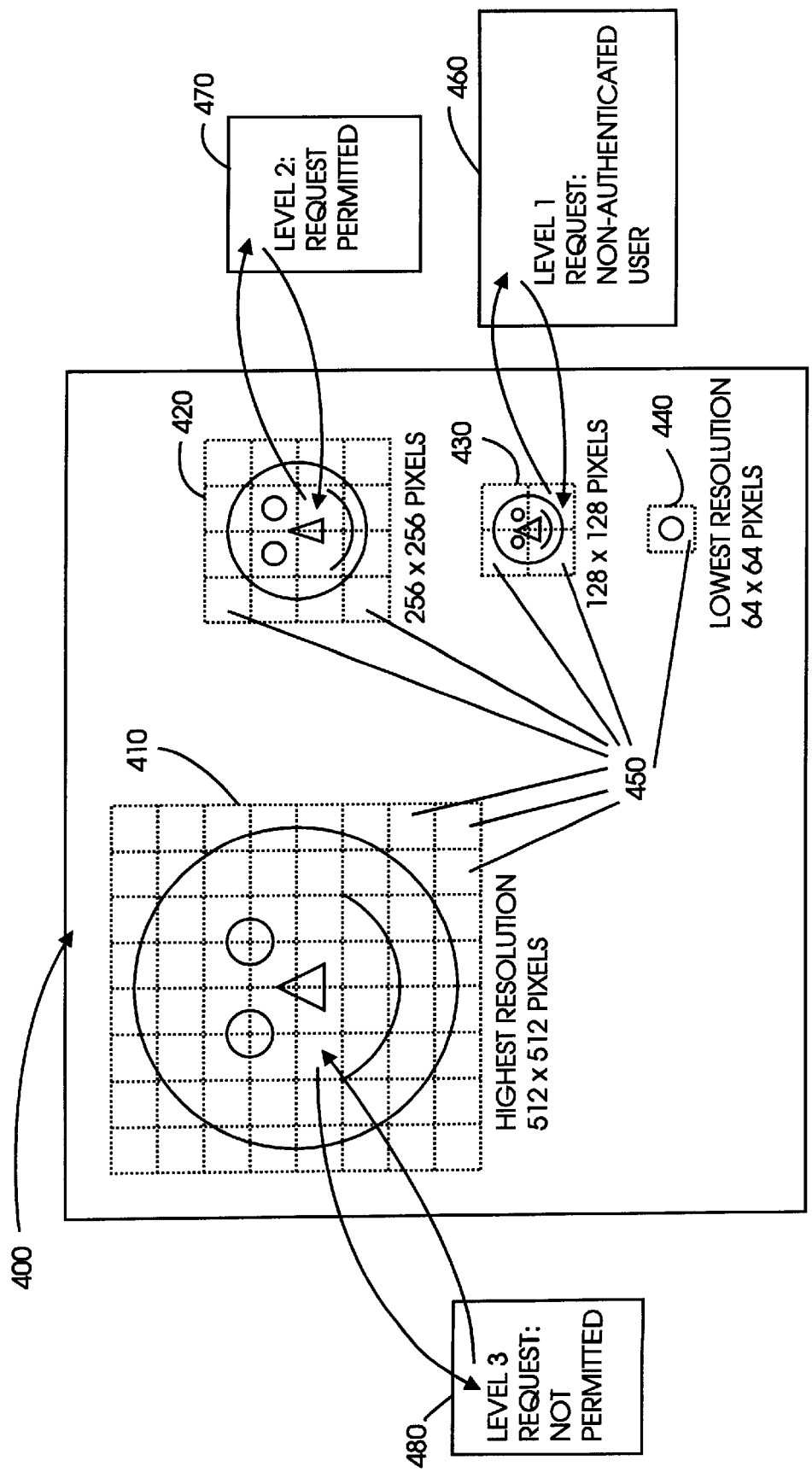
FIG. 4 is a simplified pictorial illustration of access control functionality, based on user entitlement and image resolution, of an image server constructed and operative in accordance with a preferred embodiment of the present invention.

Reference is now made to FIG. 4, which is a simplified pictorial illustration of access control functionality, based on user entitlement and image resolution, of an image server constructed and operative in accordance with a preferred embodiment of the present invention. An image server 400 contains a multi-resolution tiled image including four resolution levels. A highest resolution level, 410, contains a 512×512 pixel image. Resolution level 410 contains the most detail. A next-to-highest resolution level, 420, contains a 256×256 pixel image, obtained by filtering the highest resolution level 410. Resolution level 420 contains much detail, but less than that of its predecessor resolution level 410. A next-to-highest resolution level, 430, contains a 128×128 pixel image, obtained by filtering resolution level 420. Resolution level 430 contains some detail, but not much. Finally, a lowest resolution level, 440, contains a 64×64 pixel image. Resolution level 440 contains a minimum amount of detail. For convenience, the resolution levels are numbered from the lowest level, so that 440 is numbered 0, 430 is numbered 1, 420 is numbered 2, and 410 is numbered 3. Each of the resolution levels is sub-divided into tiles 450, each tile size preferably being 64×64 pixels.

When a user 460 issues an image request that requires the server to transmit tiles from level 1, the server first checks for user authentication. The server discovers that the user has not yet been authenticated. It prompts the user for a username and password. If authentication is denied, the server sends a message indicating that the user is not authenticated, and no image data is sent.

When another user 470 issues an image request that requires the server to transmit tiles from level 2, the server first checks for user authentication. The server discovers that the user has not yet been authenticated. It prompts the user for a username and password. If the user is successfully authenticated, the server next checks the user's entitlements. For example, the user may be entitled to view resolutions 0–2 of the image being requested. As such, the request is permitted, and the server sends the requested image data in its unmodified form.

When yet another user 480 issues an image request that requires the server to transmit tiles from level 3, the server first checks for user authentication. The server discovers that the user has not yet been authenticated. It prompts the user for a username and password. If the user is successfully authenticated, the server next checks the user's entitlements. For example, the user may be entitled to view resolutions 0–2 of the image being requested. As such, the user is not permitted to retrieve the requested image data, since the resolution level requested is higher than that to which the user is entitled. The server operates by sending watermarked image data or image data with solid color overlays. Alternatively, the server may send a message indicating that access is denied and that the best image to which the user is entitled is being sent. As a further alternative, the server may not send any image data when sending the message.

In order to authenticate a user, an image server preferably identifies a "session" between the user and the server. A session represents a specific communication dialogue between a user and a server. A session is here defined as a period of time during which a meeting occurs.

The present invention also includes a novel method for identifying a session, using a combination of cookie information, IP address, username and password. It utilizes the structures of user request data and session data, whereby user request data and session data both have a user, an IP address, a username and a password as elements. In addition user request data also has a cookie as element. A cookie in turn has a session ID and an application ID stored within it.

With this in mind, a pseudo-code description of a preferred embodiment of a method FindSession( ) to identify a session is as follows:

same ID as the cookie's session ID. If such a session is found, then a further check is made to see if the username and password of the session match those of the request. If so, then the current session has been identified.

The second block of pseudo-code concerns a case where the current session has not yet been identified. The image server loops over all sessions to find one with the same username as the user request. If such a session is found, then a further check is made to see if the session IP address also matches that of the user request. If so, then the current session has been identified. If not, then another check is made to see if a session can be found with an anonymous username, and an IP address that matches that of the user request.

The third block of pseudo-code is used to ascertain the validity of a current session, and then broadcast a notification about the users of the current and previous sessions. If a current session has been identified and if it has an anonymous username, then a check is made as to whether or not the request username is also anonymous. If the request username is anonymous, then no notification needs to be broadcast, as there is no change in status. Otherwise, if the request username is not anonymous, then the user of the current session becomes the old user, and the new user of the current session becomes the request user. An notification is broadcast indicating that a new user has been identified.

If a current session has not been identified, then a new session is created, and a notification is broadcast to signal this.

Based on the above FindSession ( ) method, various scenario sequences can be handled.

```
if(Request.Cookie != NULL)
        // loop over sessions
        if(Application.AppIID == Request.Cookie.AppIId && Session.ID == Request.Cookie.SessionID)
            if(Session.Username == Request.Username && Seesion.Password == Request.Password)
                CurrSession = Session
                break
if(CurrSession = NULL)
        // loop over sessions
        if(Session.Username == Request.Username)
            foundUser = true
            if(Session.Ip = Request.Ip)
                CurrSession = Session
                break
        if(Session.Ip == Request.Ip && Session.Username == "anonymous")
            CurrSession = Session
if(CurrSession != NULL)
        if(CurrSession.Username == "anonymous")
            if(Request.Username != "anonymous")
                oldUser = CurrSession.User
                CurrSession.User = Request.User
                Fire event CurrSession.UserSet(oldUser)
        else
            if(CurrSession.Username != Request.Username || CurrSession.Password != Request.Password)
                return HTP error (403 Forbidden)
else        // CurrSession == NULL)
        if(UniqueUsers && foundUser && Request.Username != "anonymous")
            return HTTP error (403 Forbidden)
        // Create new session
        oldUser = NULL
CurrSession.User = Request.User
Fire event CurrSession.sessionStarted( )
Fire event CurrSession.userSet(oldUser)
```

The first block of pseudo-code concerns a case where the incoming user request has a cookie associated with it. The image server loops over all sessions to find one with the 1. User A connects, has no cookie or authentication information. The image server creates a new session with an anonymous user.

2. User A is prompted with an authentication request and a cookie, and re-sends authentication information and the cookie. The server broadcasts a notification that a new user has been identified.
3. User B connects and does not accept cookies. The server creates a session with an anonymous user.
4. User B is prompted with an authentication request and a cookie, but re-sends only the authentication information. A session with the same IP address is found with an anonymous user. The server broadcasts a notification that a new user has been identified.
5. User C connects through a proxy with the same IP address as User B. A session is found with the same IP address, but with a different username. The session is skipped, and the server creates a new session with an anonymous user.
6. User C is prompted with an authentication request and a cookie, but re-sends only the authentication information. A session with the same IP is found with an anonymous user. The server broadcasts a notification that a new user has been identified.
7. User C sends a new request with only authentication information. A session with the same IP address and username is found and the passwords match. The server uses the same session.
8. User A waits until the session times out and then attempts to reconnect with authentication information and a cookie. The session does not exist any more, and the cookie is set to NULL.

Access Control User Interface

Reference is now made to FIG. 5, which is an illustration of part of a preferred user interface for a server administrator to specify a privilege policy.

A server administrator can determine whether access control is effected or entirely disabled. When access control is entirely disabled, no HTTP authentication is required and unmodified image data is supplied to all users. When access control is entirely disabled, a message is displayed in red text reading "Access control is off—all images are accessible to all users."

When access control is effected an administrator can specify default and privilege policies for any image directory. An administrator chooses, from a drop-down menu, the directory to which the default and privilege policies being specified are to be applied. If an administrator chooses a directory for which default and privilege policies already exist, then the administrator can review and edit previously specified policies.

As illustrated in FIG. 5, an administrator can input the maximum resolution level for which image data is sent unmodified. For the user interface illustrated in FIG. 5, this maximum resolution is specified on an index scale from 1–10. For example, if an administrator allows full access through index 7 in an image directory, and if an image in that directory contains 6 resolutions, then this results in access to $7/10 \times 6 = 4.2$ resolution levels. The server rounds down, allowing unrestricted access to resolution levels 0–3 in this example, but not to resolution levels 4 and 5.

The server administrator also specifies a modified display mode, watermark or overlay, to be applied to requested image portions from resolutions beyond the above referenced maximum resolution level. Geometric pattern parameters for watermarks and overlays may be specified by pressing an options button. The administrator can also input user group data for various entitlements to the selected directory.

Server Tracking

In accordance with a preferred embodiment of the present invention, server tracking functionality is provided. Server tracking provides a server administrator with a tracking log that contains feedback information about the operation of the image server, such as: how much traffic the server is encountering, which images are being accessed, and the causes of any difficulties that arise. Administrators can choose the level of detail they want to log, and can produce snapshot reports on demand or at scheduled intervals. Tracking logs are preferably output as text files, in which each line contains the date, time, tracking level, request, error information or text warning.

Server tracking also provides a server administrator with data analysis of tracked server statistics. There are many types of server statistics that a server can track. Preferably included are: (i) the number of MBytes served, (ii) the number of image requests, (iii) the number of individual image portion requests, and (iv) the number of server errors.

Typically an image server is sold commercially with a license limiting the incoming traffic that the server can handle. The price of the server increases in accordance with the license allowance. For example, a server license may limit the number of concurrent users, or the number of users served within a given time period. A server administrator can also use the present invention to track the number of license violations, in order to determine whether or not the server license is appropriate for the amount of traffic coming into the server.

Figure 6:
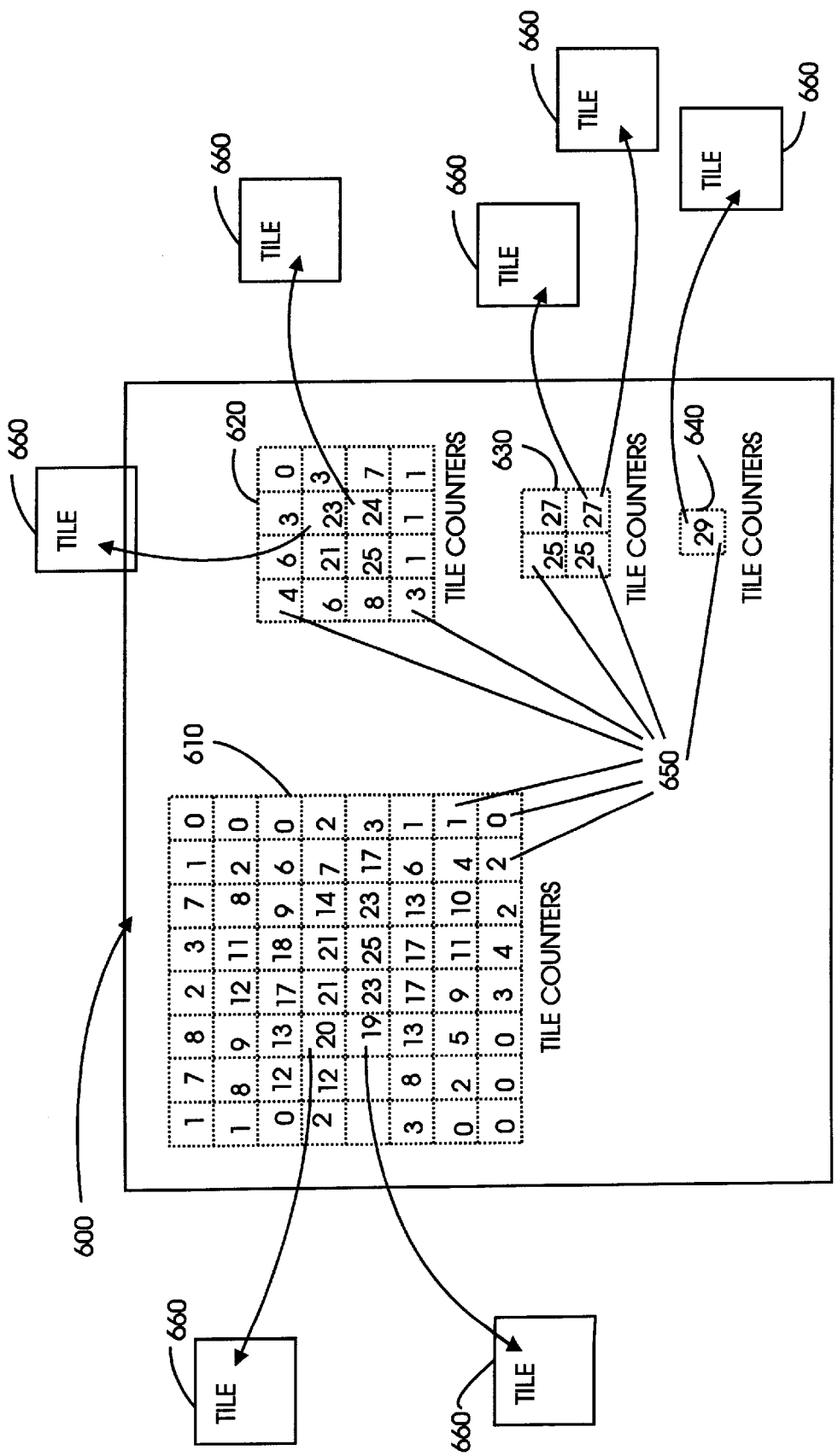
FIG. 6 is a simplified pictorial illustration of tile access tracking functionality of an image server constructed and operative in accordance with a preferred embodiment of the present invention.

Reference is now made to FIG. 6, which is a simplified pictorial illustration of tile access tracking functionality of an image server constructed and operative in accordance with a preferred embodiment of the present invention. An image server 600 contains a multi-resolution tiled image preferably with four resolution levels 610, 620, 630 and 640. These resolution levels may be similar to the resolution levels 410, 420, 430 and 440 described above with reference to FIG. 4. Each resolution level is divided into tiles, each of which preferably has a size of 64×64 pixels. Various clients 660 access tiles from among the resolution levels. As each user accesses a new tile, a tile counter is updated to reflect the number of clients who have accessed that tile. Shown in FIG. 6 are representative counters within each tile. For example, the tile in the fourth row from the top and the third column from the left in resolution level 610 has a counter value of 20, indicating that it was accessed by 20 clients. It can be seen from the example tile counter data in FIG. 6 that most clients accessed the image portions corresponding to the middle tiles at each resolution level.

Figure 7:
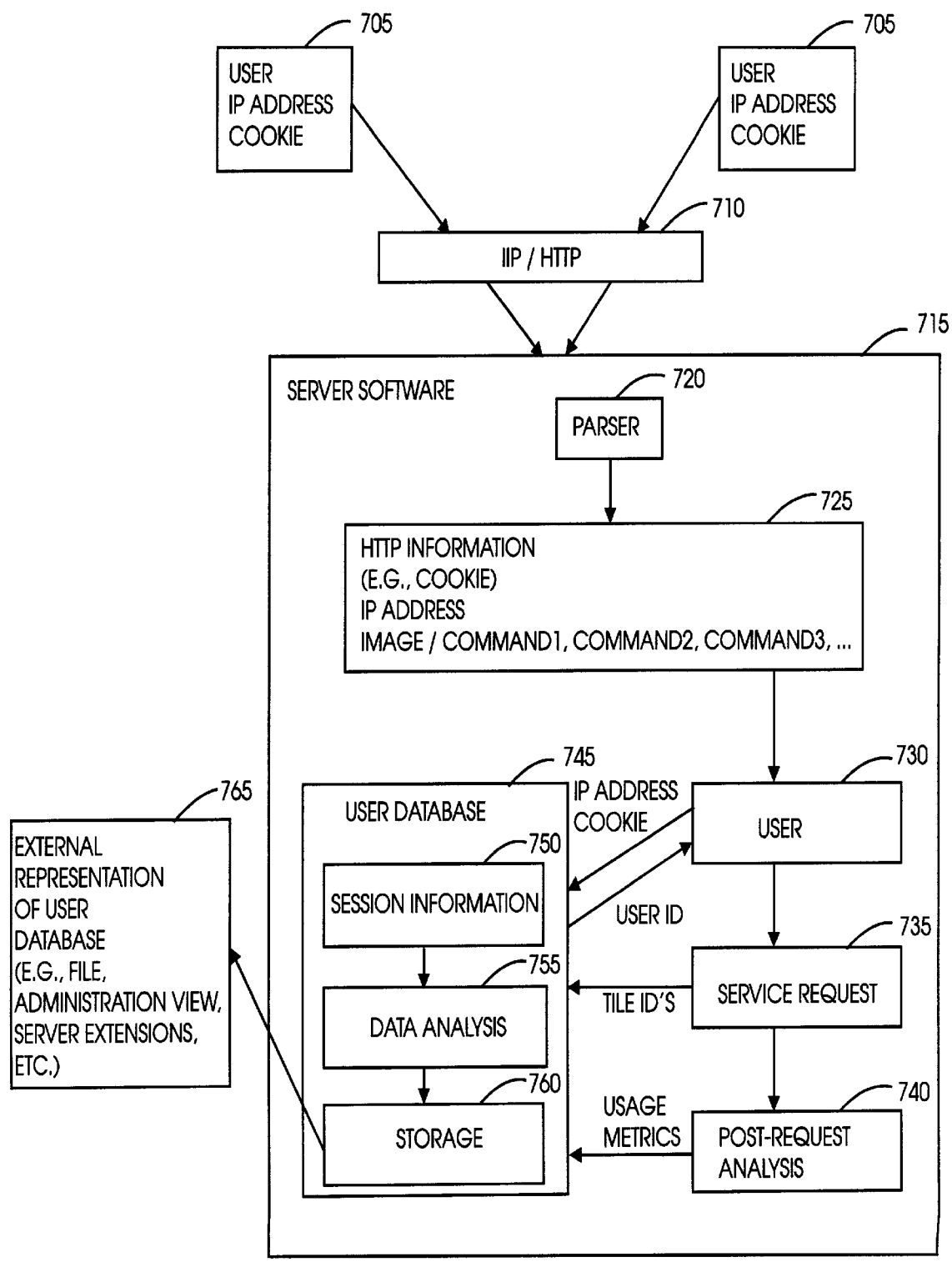
FIG. 7 is a simplified block diagram illustrating the elements of an image server tracking system in accordance with a preferred embodiment of the present invention.

Reference is now made to FIG. 7, which is a simplified block diagram illustrating the elements of an image server tracking system in accordance with a preferred embodiment of the present invention. Multiple users 705 issue IIP requests via IIP/HTTP communication ports 710 to an image server 715. Each IIP request received by server 715 is parsed by a parser unit 720. Parser unit 720 breaks up each IIP request into units of image and one or more IIP commands. The request is then preferably organized into a data structure 725 with fields for HTTP information such as a cookie, IP address, and one or more images each with a list of commands. An example of an image with a list of commands is:

image.fpx, wid=640, hei=480, cvt=jpeg

Unit 730 is a user authentication module that sends an IP address and cookie over to a user database 745 and receives a user ID in return. The user information is logged in a session information data structure 750. Unit 735 services the request. It determines which tiles of which resolution level of an image are being requested, fetches the tiles and processes them as appropriate. The information as to which tiles are accessed is also sent to user database 745. Upon completion of the request, server 715 carries out a post-request analysis in unit 740, whereby usage metrics such as the total number of bytes served and the total time expired are recorded. These usage metrics are also sent to user database 745.

User database unit 755 performs data analysis on the user and image data received, and on the usage metrics received. In a preferred embodiment of the present invention the data analysis includes statistical analysis along with cumulative totaling of usage metrics. The results of the data analysis are stored in storage unit 760. In accordance with a schedule, or upon request by a server administrator, the data stored in storage unit 760 is output to an external representation. The external representation can be, for example, a file, or an administration view. It can also be a parameter to a server extension module such as a software or hardware module.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for monitoring activity of an image server which stores a multiplicity of images, at least some of which contain plural image tiles, the method comprising:

monitoring which of said multiplicity of images stored on said image server are accessed;

monitoring accessing of individual ones of said plural image tiles of each of said multiplicity of images stored on said image server which are accessed; and providing an output indication of a number of times that each image tile of said multiplicity of images stored on said image server is accessed.

2. A method according to claim 1 and also comprising:

monitoring a time duration during which each of said multiplicity of images stored on said image server is accessed; and providing an output indication of the time duration during which each of said multiplicity of images stored on said image server is accessed.

3. A method according to claim 2 and also:

monitoring an amount of information content downloaded from the image server while each of said multiplicity of images stored on said image server is accessed; and providing an output indication of the amount of information content downloaded from the image server while each of said multiplicity of images stored on said image server is accessed.

4. A method according to claim 3 and also comprising:

monitoring a number of users accessing at least one of said multiplicity of images within a given time parameter; and providing an output indication of whether and to what extent said number of users exceeds a predetermined threshold.

5. A method according to claim 2 and also comprising:

monitoring an amount of information content downloaded from the image server while individual ones of said plural image tiles of each of said multiplicity of images stored on said image server are accessed; and providing an output indication of the amount of information content downloaded from the image server while individual ones of said plural image tiles of each of said multiplicity of images stored on said image server are accessed.

6. A method according to claim 10 and also comprising:

monitoring a number of users accessing at least one of said multiplicity of images within a given time parameter; and providing an output indication of whether and to what extent said number of users exceeds a predetermined threshold.

7. A method according to claim 2 and also comprising:

monitoring a number of users accessing at least one of said multiplicity of images within a given time parameter; and providing an output indication of whether and to what extent said number of users exceeds a predetermined threshold.

8. A method according to claim 1 and also comprising:

monitoring an amount of information content downloaded from the image server while each of said multiplicity of images stored on said image server is accessed; and providing an output indication of the amount of information content downloaded from the image server while each of said multiplicity of images stored on said image server is accessed.

9. A method according to claim 8 and also comprising:

monitoring a number of users accessing at least one of said multiplicity of images within a given time parameter; and providing an output indication of whether and to what extent said number of users exceeds a predetermined threshold.

10. A method according to claim 1 and also comprising:

monitoring an amount of information content downloaded from the image server while individual ones of said plural image tiles of each of said multiplicity of images stored on said image server are accessed; and providing an output indication of the amount of information content downloaded from the image server while individual ones of said plural image ties of each of said multiplicity of images stored on said image server are accessed.

11. A method according to claim 10 and also comprising:

monitoring a number of users accessing at least one of said multiplicity of images within a given time parameter; and providing an output indication of whether and to what extent said number of users exceeds a predetermined threshold.

12. A method according to claim 1 and also comprising:

monitoring a number of users accessing at least one of said multiplicity of images within a given time parameter; and providing an output indication of whether and to what extent said number of users exceeds a predetermined threshold.

13. A system for monitoring activity of an image server which stores a multiplicity of images, at least some of which contain plural image tiles, the system comprising:

an image monitor, monitoring which of said multiplicity of images stored on said image server are accessed;

an image tile monitor, monitoring accessing individual ones of said plural image tiles of each of said multiplicity of images stored on said image server which are accessed; and an output device, providing an output indication of a number of times that each image tile of said multiplicity of images stored on said image server is accessed.

14. A system according to claim 13 and also comprising:

a time monitor, monitoring a time duration during which each of said multiplicity of images stored on said image server is accessed; and an output device, providing an output indication of the time duration during which each of said multiplicity of images stored on said image server is accessed.

15. A system according to claim 14 and also comprising:

a data monitor, monitoring an amount of information content downloaded from the image server while each of said multiplicity of images stored on said image server is accessed; and an output device, providing an output indication of the amount of information content downloaded from the image server while each of said multiplicity of images stored on said image server is accessed.

16. A system according to claim 15 and also comprising:

a usage monitor, monitoring a number of users accessing at least one of said multiplicity of images within a given time parameter; and an output device, providing an output indication of whether and to what extent said number of users exceeds a predetermined threshold.

17. A system according to claim 14 and also comprising:

a data monitor, monitoring an amount of information content downloaded from the image server while individual ones of said plural image tiles of each of said multiplicity of images stored on said image server are accessed; and an output device, providing an output indication of the amount of information content downloaded from the image server while individual ones of said plural image tiles of each of said multiplicity of images stored on said image server are accessed.

18. A system according to claim 17 and also comprising:

a usage monitor, monitoring a number of users accessing at least one of said multiplicity of images within a given time parameter; and an output device, providing an output indication of whether and to what extent said number of users exceeds a predetermined threshold.

19. A system according to claim 14 and also comprising:

a usage monitor, monitoring a number of users accessing at least one of said multiplicity of images within a given time parameter; and an output device, providing an output indication of whether and to what extent said number of users exceeds a predetermined threshold.

20. A system according to claim 13 and also comprising:

a data monitor, monitoring an amount of information content downloaded from the image server while each of said multiplicity of images stored on said image server is accessed; and an output device, providing an output indication of the amount of information content downloaded from the image server while each of said multiplicity of images stored on said image server is accessed.

21. A system according to claim 20 and also comprising:

a usage monitor, monitoring a number of users accessing at least one of said multiplicity of images within a given time parameter; and an output device, providing an output indication of whether and to what extent said number of users exceeds a predetermined threshold.

22. A system according to claim 13 and also comprising:

a data monitor, monitoring an amount of information content downloaded from the image server while individual ones of said plural image tiles of each of said multiplicity of images stored on said image server are accessed; and an output device, providing an output indication of the amount of information content downloaded from the image server while individual ones of said plural image tiles of each of said multiplicity of images stored on said image server are accessed.

23. A system according to claim 22 and also comprising:

a usage monitor, monitoring a number of users accessing at least one of said multiplicity of images within a given time parameter; and an output device, providing an output indication of whether and to what extent said number of users exceeds a predetermined threshold.

24. A system according to claim 13 and also comprising:

a usage monitor, monitoring a number of users accessing at least one of said multiplicity of images within a given time parameter; and an output device, providing an output indication of whether and to what extent said number of users exceeds a predetermined threshold.

25. A method for controlling activity of an image server which stores a multiplicity of images, at least some of which are at various levels of resolution, the method comprising:

monitoring an authorization status of a user seeking to access one of said multiplicity of images stored on an image server; and controlling access to said multiplicity of images stored on said image server based on a level of resolution of the image to which the user seeks access and the authorization status of the user.

26. A method for controlling activity of an image server according to claim 25 and wherein:

at least some of said multiplicity of images are stored on said image server at plural levels of resolution; and said controlling access determines whether access is to be provided to an image at a given one of said plural levels of resolution.

27. A method for controlling activity of an image server according to claim 26 and wherein the controlling access comprises controlling viewing.

28. A method for controlling activity of an image server according to claim 26 and wherein the controlling access comprises controlling downloading.

29. A method for controlling activity of an image server according to claim 26 and wherein the controlling access comprises controlling printing.

30. A method for controlling activity of an image server according to claim 26 and wherein said controlling access comprises determining whether an image is provided to a user with markings.

31. A method for controlling activity of an image server according to claim 26 and wherein said controlling access comprises determining whether an image is provided to a user.

32. A method for controlling activity of an image server according to claim 26 and wherein said multiplicity of images include images for which access is provided to a user irrespective of the authorization status of a user.

33. A method for controlling activity of an image server according to claim 26 and wherein said at least some of said multiplicity of images stored on said image server at plural levels of resolution include images for which access is provided to a user at some of said plural levels of resolution irrespective of the authorization status of the user.

34. A method for controlling activity of an image server according to claim 26 and wherein the monitoring an authorization status of a user includes determining which of a plurality of authorization levels is associated with a given user.

35. A method for controlling activity of an image server according to claim 25 and wherein the controlling access comprises controlling viewing.

36. A method for controlling activity of an image server according to claim 25 and wherein the controlling access comprises controlling downloading.

37. A method for controlling activity of an image server according to claim 25 and wherein the controlling access comprises controlling printing.

38. A method for controlling activity of an image server according to claim 25 and wherein said controlling access comprises determining whether an image is provided to a user with markings.

39. A method for controlling activity of an image server according to claim 25 and wherein said controlling access comprises determining whether an image is provided to a user.

40. A method for controlling activity of an image server according to claim 25 and wherein said multiplicity of images include images for which access is provided to a user irrespective of the authorization status of a user.

41. A method for controlling activity of an image server according to claim 25 and wherein the monitoring an authorization status of a user includes determining which of a plurality of authorization levels is associated with a given user.

42. A system for controlling activity of an image server which stores a multiplicity of images, at least some of which are at various levels of resolution, the system comprising:
   a status monitor, monitoring an authorization status of a user seeking to access one of said multiplicity of images stored on an image server; and
   an access controller, controlling access to said multiplicity of images stored on said image server based on a level of resolution of the image to which the user seeks access and the authorization status of the user.

43. A system for controlling activity of an image server according to claim 42 and wherein:
   at least some of said multiplicity of images are stored on said image server at plural levels of resolution; and
   said access controller determines whether access is to be provided to an image at a given one of said plural levels of resolution.

44. A system for controlling activity of an image server according to claim 43 and wherein said access controller controls viewing.

45. A system for controlling activity of an image server according to claim 43 and wherein said access controller controls downloading.

46. A system for controlling activity of an image server according to claim 43 and wherein said access controller controls printing.

47. A system for controlling activity of an image server according to claim 43 and wherein said access controller determines whether an image is provided to a user with markings.

48. A system for controlling activity of an image server according to claim 43 and wherein said access controller determines whether an image is provided to a user.

49. A system for controlling activity of an image server according to claim 43 and wherein said multiplicity of images include images for which access is provided to a user irrespective of the authorization status of a user.

50. A system for controlling activity of an image server according to claim 43 and wherein said at least some of said multiplicity of images stored on said image server at plural levels of resolution include images for which access is provided to a user at some of said plural levels of resolution irrespective of the authorization status of the user.

51. A system for controlling activity of an image server according to claim 43 and wherein said status monitor includes an authorization verifier, determining which of a plurality of authorization levels is associated with a given user.

52. A system for controlling activity of an image server according to claim 42 and wherein said access controller controls viewing.

53. A system for controlling activity of an image server according to claim 42 and wherein said access controller controls downloading.

54. A system for controlling activity of an image server according to claim 42 and wherein said access controller controls printing.

55. A system for controlling activity of an image server according to claim 42 and wherein said access controller determines whether an image is provided to a user with markings.

56. A system for controlling activity of an image server according to claim 42 and wherein said access controller determines whether an image is provided to a user.

57. A system for controlling activity of an image server according to claim 42 and wherein said multiplicity of images include images for which access is provided to a user irrespective of the authorization status of a user.

58. A system for controlling activity of an image server according to claim 42 and wherein said status monitor includes an authorization verifier, determining which of a plurality of authorization levels is associated with a given user.

59. A method for monitoring activity of an image server which stores a multiplicity of images, at least some of which contain plural image tiles, the method comprising:
   monitoring which of said multiplicity of images stored on said image server are accessed;
   monitoring a time duration during which each of said image tiles of said multiplicity of images stored on said image server is accessed; and
   providing an output indication of the time duration during which each of said image tiles of said multiplicity of images stored on said image server is accessed.

60. A method according to claim 59 and also comprising:
   monitoring an amount of information content downloaded from the image server while each of said multiplicity of images stored on said image server is accessed; and
   providing an output indication of the amount of information content downloaded from the image server while each of said multiplicity of images stored on said image server is accessed.

61. A method according to claim 60 and also comprising:

monitoring ia number of users accessing at least one of said multiplicity of images within a given time parameter; and providing an output indication of whether and to what extent said number of users exceeds a predetermined threshold.

62. A method according to claim 59 and also comprising:

monitoring an amount of information content downloaded from the image server while individual ones of said plural image tiles of each of said multiplicity of images stored on said image server are accessed; and providing an output indication of the amount of information content downloaded from the image server while individual ones of said plural image tiles of each of said multiplicity of images stored on said image server are accessed.

63. A method according to claim 62 and also comprising:

monitoring a number of users accessing at least one of said multiplicity of images within a given time parameter; and providing an output indication of whether and to what extent said number of users exceeds a predetermined threshold.

64. A method according to claim 59 and also comprising:

monitoring a number of users accessing at least one of said multiplicity of images within a given time parameter; and providing an output indication of whether and to what extent said number of users exceeds a predetermined threshold.

65. A system for monitoring activity of an image server which stores a multiplicity of images, at least some of which contain plural image tiles, the system comprising:

an image monitor, monitoring which of said multiplicity of images stored on said image server are accessed;

a time monitor, monitoring a time duration during which each of said image tiles of said multiplicity of images stored on said image server is accessed; and an output device, providing an output indication of the time duration during which each of said image tiles of said multiplicity of images stored on said image server is accessed.

66. A system according to claim 65 and also comprising:

a data monitor, monitoring an amount of information content downloaded from the image server while each of said multiplicity of images stored on said image server is accessed; and an output device, providing an output indication of the amount of information content downloaded from the image server while each of said multiplicity of images stored on said image server is accessed.

67. A system according to claim 66 and also comprising:

a usage monitor, monitoring a number of users accessing at least one of said multiplicity of images within a given time parameter; and an output device, providing an output indication of whether and to what extent said number of users exceeds a predetermined threshold.

68. A system according to claim 65 and also comprising:

a data monitor, monitoring an amount of information content downloaded from the image server while individual ones of said plural image tiles of each of said multiplicity of images stored on said image server are accessed; and an output device, providing an output indication of the amount of information content downloaded from the image server while individual ones of said plural image tiles of each of said multiplicity of images stored on said image server are accessed.

69. A system according to claim 68 and also comprising:

a usage monitor, monitoring a number of users accessing at least one of said multiplicity of images within a given time parameter; and an output device, providing an output indication of whether and to what extent said number of users exceeds a predetermined threshold.

70. A system according to claim 65 and also comprising:

a usage monitor, monitoring a number of users accessing at least one of said multiplicity of images within a given time parameter; and an output device, providing an output indication of whether and to what extent said number of users exceeds a predetermined threshold.

71. A method for controlling and monitoring activity of an image server which stores a multiplicity of images, at least some of which contain plural image tiles and are at various levels of resolutions, the method comprising:

monitoring which of said multiplicity of images stored on said image server are accessed;

monitoring accessing of said plural image tiles of each of said multiplicity of images stored on said image server which are accessed;

providing an output indication of the number of times that each image tile of said multiplicity of images stored on said image server is accessed;

monitoring an authorization status of a user seeking to access one of said multiplicity of images stored on said image server; and controlling access to said multiplicity of images stored on said image server based on a level of resolution of the images to which the user seeks access and the authorization status of the user.

72. A system for controlling and monitoring activity of an image server which stores a multiplicity of images, at least some of which contain plural image tiles and are at various levels of resolutions, the system comprising:

an image monitor, monitoring which of said multiplicity of images stored on said image server are accessed;

an image tile monitor, monitoring accessing of said plural image tiles of each of said multiplicity of images stored on said image server which are accessed;

an output device, providing an output indication of a number of times that each image tile of said multiplicity of images stored on said image server is accessed;

a status monitor, monitoring an authorization status of a user seeking to access one of said multiplicity of images stored on said image server; and an access controller, controlling access to said multiplicity of images stored on said image server based on a level of resolution of the images to which the user seeks access and the authorization status of the user.

* * * * *